Patented Oct. 20, 1931

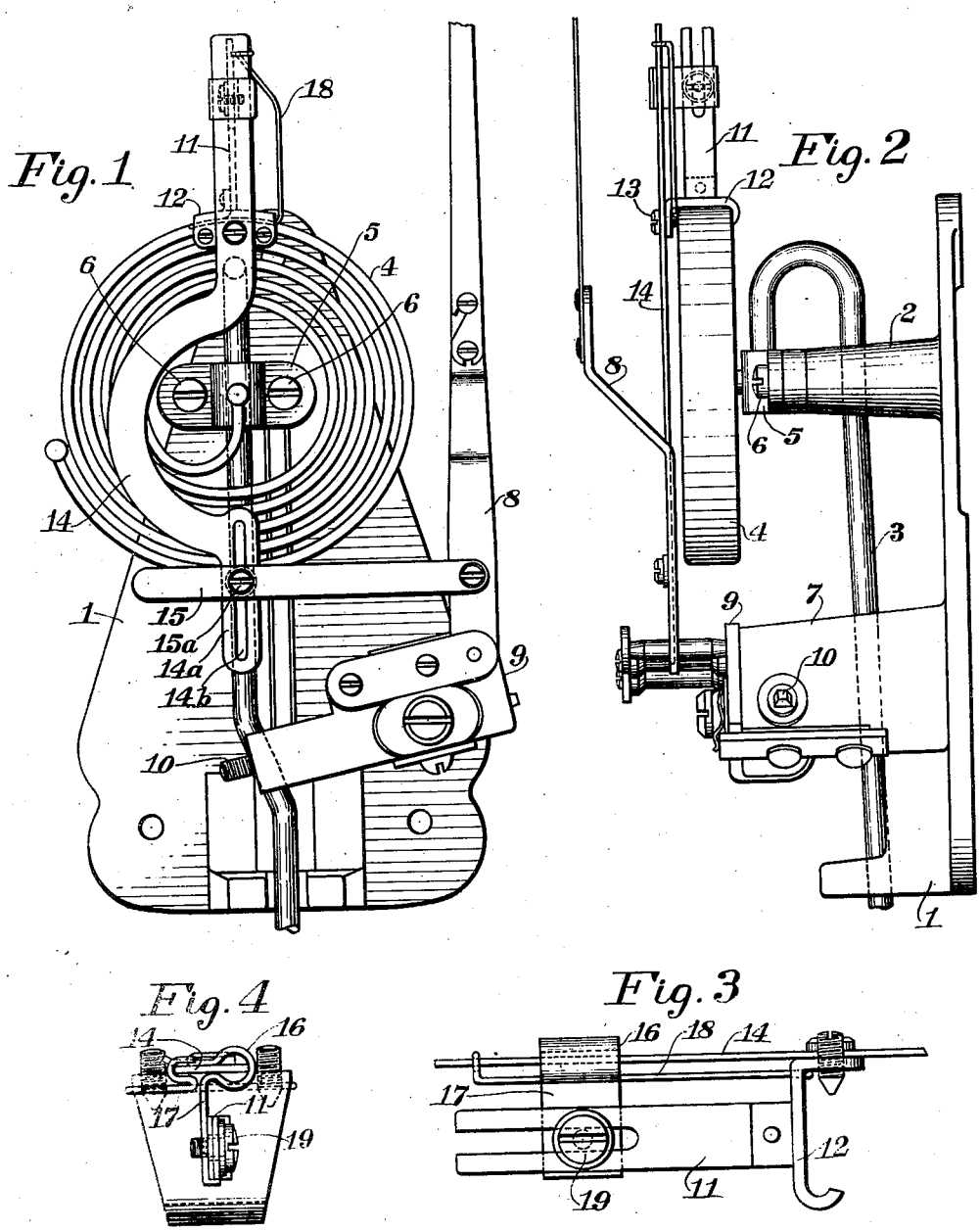

1,827,804

UNITED STATES PATENT OFFICE

KENNETH L. TATE, OF ROCHESTER, NEW YORK, ASSIGNOR TO TAYLOR INSTRUMENT COMPANIES, OF ROCHESTER, NEW YORK, A CORPORATION OF NEW YORK

PRESSURE RESPONSIVE INSTRUMENT

Application filed November 10, 1927. Serial No. 232,456.

This invention relates to instruments of the type containing a Bourdon spring or the like and more in particular to temperature measuring, regulating and recording instruments containing a pressure-responsive element of the Bourdon spring type.

Instruments of the character referred to include as basic elements a bulb, a Bourdon spring and a capillary filled with a temperature-responsive medium. Variations of temperature at the bulb causes variations of pressure in the system and the variations of pressure, in turn, cause contraction or expansion of the Bourdon spring relatively to a definite normal condition at a definite temperature.

Ordinarily variations in the temperature surrounding the Bourdon spring are small as compared with the variations at the bulb end and errors due to variations in temperature at the Bourdon spring have heretofore been minimized by reducing the volume of the Bourdon spring to a minimum. However, the errors caused by variations in the temperature surrounding the Bourdon spring are not negligible and must be compensated for to obtain accurate results.

It is a special object of this invention to provide a system of the type referred to including means for accurately compensating for variations in the temperature surrounding the Bourdon spring.

It is a more particular object to provide compensating means which do not in any way interfere with the calibration of the instrument and zero adjustments.

Another object is an instrument which may be easily calibrated and adjusted for zero position.

The object of the invention, the principle of operation on which it is based, its execution and advantages may be readily understood from the specification in connection with the accompanying drawings, wherein Fig. 1 is a front view of a mechanism embodying the invention;

Fig. 2 is a side view thereof;

Fig. 3 is a side view on a larger scale, of the detail structure representing the invention;

Fig. 4 is an end view of the same detail.

Having reference to the drawings, 1 is a support which in practice is attached to the rear wall of a casing of usual construction which need not be shown. This support has no particular significance in itself and may have various forms. In the particular instance, the support 1 includes two studs 2 slightly spaced from each other in lateral direction to allow the capillary 3 to pass between them. The capillary 3 is connected to the inner end of the Bourdon spring 4 and the spring together with the capillary is supported by means of a strap 5 or the like attached by means of screws 6 to the studs 2. The support 1 also includes a block 7 affording a pivotal support for the pen arm 8. The pen arm 8 is pivotally mounted on a carriage 9 which, in turn, is mounted for sliding movement on the block 7. This sliding movement may be conveniently effected by a screw 10.

The detail so far described may be considered as representing the prior art.

The invention includes a bimetallic strip 11 attached to the outer convolution of the spring 4, preferably by means of a clamp 12 adjustable lengthwise of the convolution. On the clamp 12 is pivotally supported by means of a stud 13 an arm 14 connected at its lower end with a lever 15, which, in turn, is pivotally connected with the pen arm 8. The upper portion of the arm 14 is normally seated in a bight 16 of a lug 17 which is attached to the bimetallic strip 11 for adjustment thereon in the direction of its length. A spring 18 secured to the clamp 12 is arranged to resiliently bear upon the arm 14 tending to maintain it in the bight 16.

In the particular instance, the bimetallic strip 11 is slitted and a set screw 19 passing through the slit may be used to permit adjustment of the lug 17 lengthwise of the bimetallic strip.

The operation is as follows:

Assume that the position of the parts in Fig. 1 represents the pressure or temperature value at the bottom of a scale for which the instrument is calibrated. With increase of pressure in the bulb (not shown) the spring 4 expands and the arm 14 is angularly moved causing the pen arm 8 to move to the right.

Adjustment for zero position may be made in the first instance by loosening the clamp 12 and shifting it to the right or the left as may be necessary. An additional fine adjustment may be made by moving the carriage 9 and with it the pivot support for the pen arm 8 to the right or the left as the case may be.

The throw of the pen arm i. e. the range may be adjusted by means of an adjustable connection between the arm 14 and the lever 15 as indicated. The arm 14 has a foot 14a provided with a substantially radial slot 14b in which the pivot screw 15a may be adjustably secured.

By concurrent manipulation of the various adjusting means referred to, the instrument may be accurately calibrated.

The spring 18 is of sufficient strength to maintain the arm 14 in its extreme position against the lug 17 so that normally no relative motion can take place between the arm 14 and the lug 17. However, in case the pen should reach a position where further movement is stopped, as for instance by the casing, while the spring 4 is still expanding under overload conditions, the spring 18 will readily yield to permit relative movement between the arm 14 and the lug 17.

The bimetallic strip 11 is so constructed and arranged that upon increase of temperature it will curve in a direction opposite to the expanding movement of the coil at the point where the clamp 12 is attached, i. e., to the right as seen in Fig. 1. The curving movement of the strip 11 thereby moves the outer end of the arm 14 with it, causing a slight angular movement of the latter relatively to the spring 4. The movement of arm 14 resulting from a curving of the strip 11 causes movement of the pen arm 8 toward the inner or lower end of the scale. The action of the strip 11 thus automatically corrects the position of the pen arm in proportion to the rise of temperature at the spring 4 over and above a normal temperature at which the effect of the strip 11 is zero.

The amplitude of the correcting movement may be easily varied by movement of the lug 17 inwardly or outwardly on the strip 11.

The arm 14 is preferably curved to permit access to the center of the spring and the screws 6 for the removal of the spring from its support.

While I have shown the arm 14 as mounted on the spring 4, it may be mounted independently of the spring so long as it is moved by the latter.

I claim:

1. In instruments of the class described, the combination with a Bourdon spring having one end fixed and the other end movable, of a member pivotally supported near the Bourdon spring and means for translating movement from the spring to the said member, including an arm pivotally supported between its ends, a bi-metallic strip secured at one end to the spring and a connection between the strip and the arm, said connection being adjustable lengthwise of the strip.

2. In instruments of the class described, the combination with a Bourdon spring having one end fixed and the other end movable, of a member movably supported near the Bourdon spring and means for translating movement from the spring to the said member, including an arm supported on the spring for pivotal movement about a point between its ends, a bi-metallic strip secured at one end to the spring and a connection between the strip and the arm, said connection being adjustable lengthwise of the strip.

3. In instruments of the class described, the combination with a Bourdon spring having one end fixed and the other end movable, of a member movably supported near the Bourdon spring and means for translating movement from the spring to the said member, including a clamp secured to the spring for adjustment on it in the direction of its length, an arm pivoted on the clamp, a bi-metallic strip on the clamp and a connection between the strip and the arm, adjustable lengthwise of the strip and a connection between the arm and the said member.

4. In instruments of the character described, the combination with a Bourdon spring and a member to be moved thereby, of means for translating movement from the spring to said member, comprising an arm movably connected to the spring, a temperature-sensitive means connected with the spring and the arm for varying the position of the arm relatively to the spring in proportion to variations in the surrounding temperature and a connection between the arm and the said member.

In testimony whereof I affix my signature.

KENNETH L. TATE.